(12) United States Patent
Nomura et al.

(10) Patent No.: US 6,672,271 B2
(45) Date of Patent: Jan. 6, 2004

(54) ENGINE CRANKSHAFT SUPPORT STRUCTURE

(75) Inventors: Akifumi Nomura, Saitama (JP); Yasuo Shimura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/124,346

(22) Filed: Apr. 18, 2002

(65) Prior Publication Data

US 2002/0157635 A1 Oct. 31, 2002

(30) Foreign Application Priority Data

Apr. 30, 2001 (JP) ........................................ 2001-170269

(51) Int. Cl.[7] ................................................. F02F 7/00
(52) U.S. Cl. ................................................. 123/195 R
(58) Field of Search ........................ 123/195 R, 195 A, 123/90.31

(56) References Cited

U.S. PATENT DOCUMENTS 2,303,093 A * 11/1942 Schreck ................ 123/195 A

FOREIGN PATENT DOCUMENTS

JP 2813011 B2 8/1998

* cited by examiner

Primary Examiner—Noah P. Kamen
(74) Attorney, Agent, or Firm—Birch, Stewart, Kolasch & Birch, LLP

(57) ABSTRACT

A crankshaft support structure for an engine. An inner race forming a part of a main bearing is loosely fitted onto a bearing seat of a shaft. A direction of thrust is fixed by a flange of a timing sprocket which is press-fitted onto the shaft. The outer diameter R1 of the timing sprocket and the outer diameter R3 of the flange are respectively set so that they are smaller than the outer diameter R4 of the inner race. An outer race of the main bearing is press-fitted and fixed to the side of a left crankcase and a roller is integrated. When the shaft enters the inside of the roller, the timing sprocket and the flange pass through the inside of the roller, and the inner race is fitted to the roller. As a result, the inner diameter R2 of the inner race can be made smaller than the outer diameter R1 of the timing sprocket. Thus the main bearing supporting the crankshaft is miniaturized and lightened.

14 Claims, 3 Drawing Sheets

ENGINE CRANKSHAFT SUPPORT STRUCTURE

CROSS-REFERENCE TO RELATED APPLICATIONS

The present application claims priority under 35 U.S.C. §119 to Japanese Patent Application No. 2001-170269, filed on Apr. 30, 2001, the entire contents thereof are hereby incorporated by reference.

BACKGROUND OF THE INVENTION

1. Field of the Invention

The present invention relates to crankshaft support structure of an engine.

2. Description of Background Art

A crankshaft which is supported by a main bearing and to which a sprocket is fitted is disclosed in Japanese patent No. 2813011. FIG. 3 shows one example of such crankshaft support structure, and highlights crankshaft 1, main bearing 2, inner race 3, ball 4, outer race 5, crankcase 6, timing sprocket 7 fitted onto the periphery of the crankshaft 1, and timing chain 8. The outer diameter R1 of the timing sprocket 7 is set so that it is smaller than the inner diameter R2 of the inner race 3. The crankshaft 1 is fitted with timing sprocket 7 beforehand. During assembly, the crankshaft is passed through the inside of the main bearing 2, the main bearing having previously been fixed to the side of the crankcase 6.

With this conventional structure, since the crankshaft 1 integrated with the timing sprocket 7 must pass inside of the main bearing 2 during assembly, the inner diameter R2 of the inner race 3 of the main bearing 2 must be larger than the outer diameter R1 of the timing sprocket 7. As a result, the size of the main bearing 2 is regulated by the timing sprocket 7. This limits the ability to miniaturize the main bearing 2. As a result, the main bearing is larger and heavier than is desireable.

SUMMARY AND OBJECTS OF THE INVENTION

The object of the present invention is to develop a smaller and lighter crankshaft support structure.

To accomplish this objective, engine crankshaft support structure according to the invention is based upon an engine in which a sprocket for driving a timing chain for driving a camshaft is arranged outside a main bearing for supporting a crankshaft. The structure includes an outer race of the main bearing which is press-fitted and fixed to a crankcase, an inner race of the main bearing is separated from the outer race and is loosely fitted onto the periphery of a crankshaft, and the sprocket for driving the timing chain which is press-fitted onto the periphery of the crankshaft for holding the inner race of the main bearing in place.

An oil seal mounting flange is integrated with the sprocket for driving the timing chain, and a side part of the flange presses against the inner race of the main bearing.

According to the invention, as the outer race of the main bearing is press-fitted and fixed to the crankcase, the inner race is separated from the outer race and is loosely fitted to the crankshaft and the inner race is fixed by press-fitting and fixing the timing sprocket to the crankshaft. Further, the crankshaft which has been integrated with the inner race beforehand is made to pass inside of the outer race of the main bearing, the main bearing having been previously press-fitted and fixed to the crankcase. Thus, the inner race is fitted inside of the outer race, and the main bearing is formed.

As a result, the inner diameter of an inner bearing can be made smaller than the outer diameter of the timing sprocket, and the size of the main bearing can be minimized. Therefore, the main bearing can be made smaller and lighter than previously possible. Also, oil seal mounting structure can be simplified by using a flange for mounting both an oil seal and the timing sprocket, as well as for pressing against the inner race to hold it into place.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
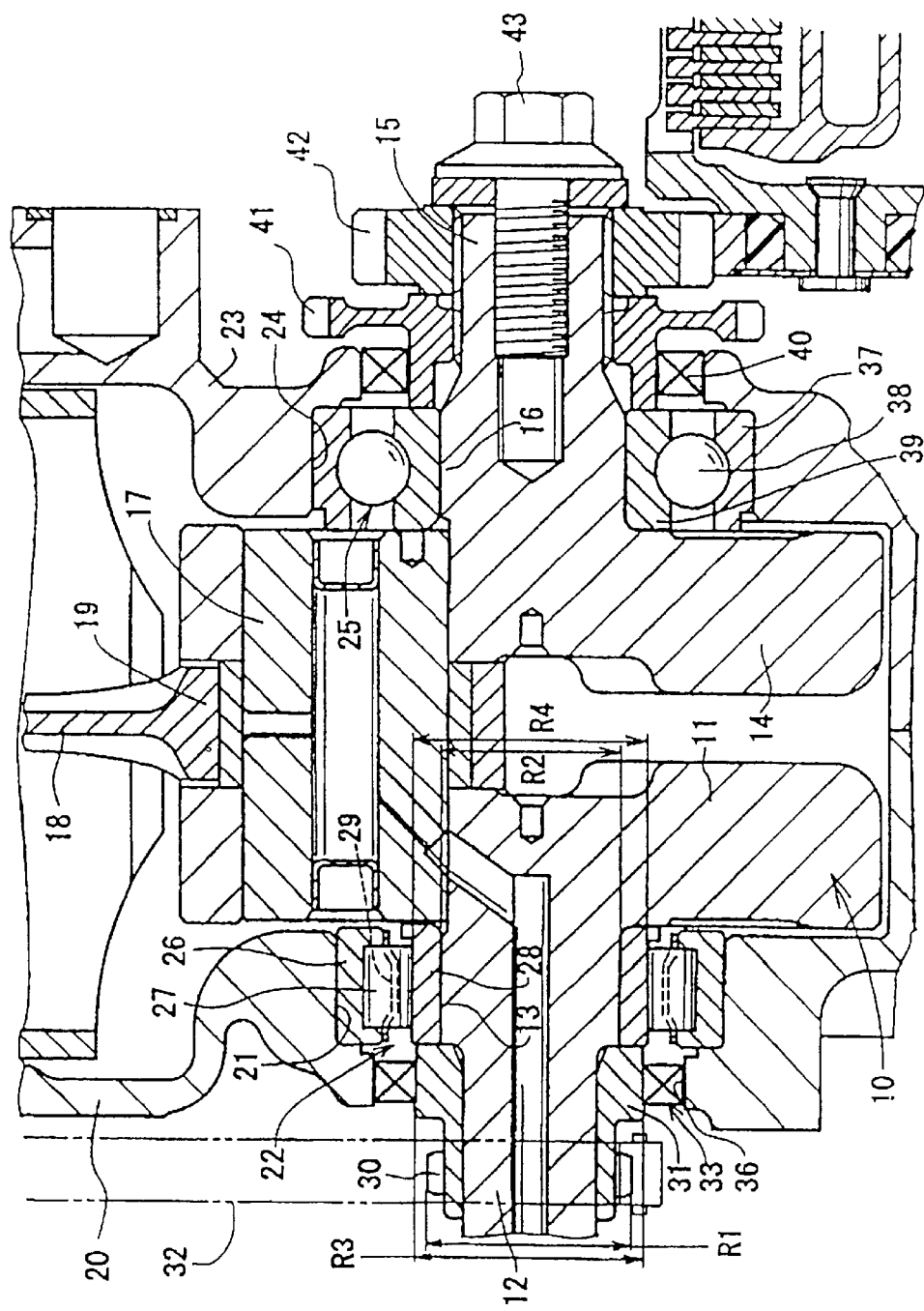
FIG. 1 is a sectional view showing a main part of this embodiment.
Figure 2:
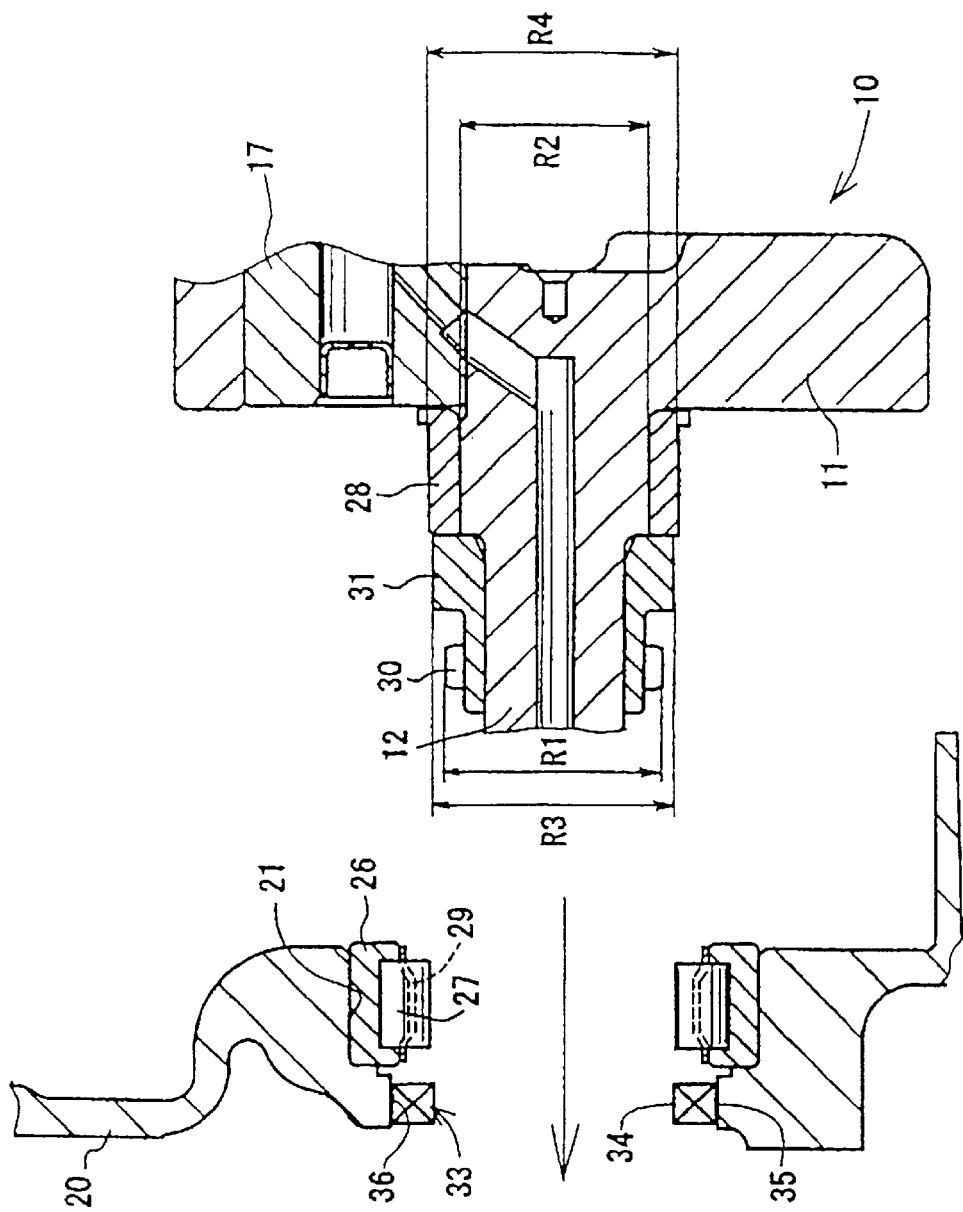
FIG. 2 shows a method of assembling the main part in the embodiment.
Figure 3:
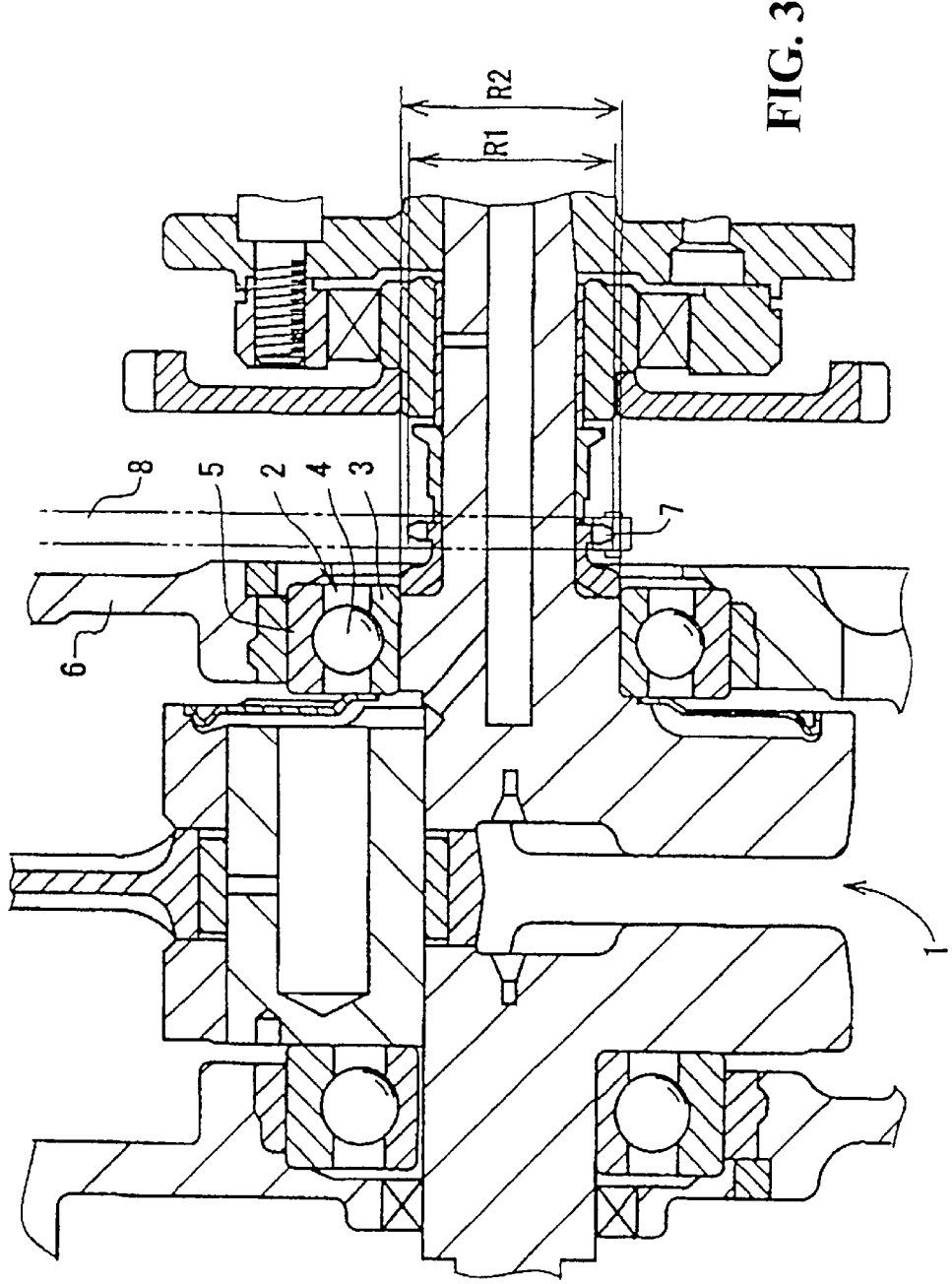
FIG. 3 is the similar sectional view showing a main part found conventionally in prior art.

Referring to the drawings, one embodiment will be described below. FIG. 1 shows crankshaft support structure in an engine for a motorcycle and FIG. 2 shows a method of assembling the support structure. The reference numbers used in the FIGS. 1 and 2 of the present invention are common to the reference numbers used the prior art FIG. 3. The right and the left in the following description are based upon the crankshaft support structure shown in FIG. 1.

A crankshaft 10 is divided into right and left parts and the left side is provided with a web 11. Shaft 12 extends integrally from the center, and a bearing seat 13 is provided on the periphery of the shaft 12 in the vicinity of the web 11. The right side is similarly provided with a web 14. Shaft 15 extends integrally from the center, and a bearing seat 16 is provided on the periphery of the shaft 15 in the vicinity of the web 14. The right and left webs 11 and 14 are integrated by a crankpin 17, and a big end 19 of a connecting rod 18 coupled to a piston (not shown) is supported around the crankpin 17.

A main bearing 22 is provided between the bearing seat 13 in the left side part of the crankshaft 10. Journal hole 21 is provided to the corresponding left crankcase 20. Similarly, a main bearing 25 is provided between the bearing seat 16 in the right side part of the crankshaft 10. Journal hole 24 is provided to the corresponding right crankcase 23. The left crankcase 20 and the right crankcase 23 are right and left parts into which a crankcase is divided. The crankcase is assembled by joining and connecting the right and left parts.

The main bearing 22 is formed as a roller bearing against a thrust load, and includes an outer race 26, a roller 27 and an inner race 28. The outer race 26 is press-fitted and fixed into a journal hole 21 beforehand. The roller 27 is held integrally with the side of the outer race 26 by a retainer 29.

The inner race 28 is formed so that it can be separated from the side of the outer race 26. The inner race 28 is independently loosely fitted onto the bearing seat 13 of the shaft 12. Further, the direction of a thrust is fixed by a flange 31 of a timing sprocket 30 press-fitted onto the shaft 12 from the outside of the bearing seat 13. Timing chain 32 transmits the revolution of the crankshaft 10 to a camshaft in a valve train (not shown).

The flange 31 has a thickened part bulged on the side of the timing sprocket 30. The outer diameter R3 of the flange 31 is larger than the outer diameter R1 of the timing sprocket 30. The outer diameter R3 of the flange 31 is substantially equal to the outer diameter R4 of the rolling contact surface of the inner race 28. The inner diameter R2 is smaller than the outer diameter R1 of the timing sprocket 30. Therefore, the relationship of the diameters of these parts may be expressed as follows:

$$R3 \sim R4 > R1 > R2$$

The peripheral surface of the flange 31 functions as a face on which an oil seal 33 is slid. Seal lip 34 of the oil seal 33 is slid on the face of the flange 31. The fixed part 35 of the oil seal 33 is press-fitted and fixed onto the seal bearing surface 36 of the crankcase 20 (see FIG. 2).

The main bearing 25 on the right side of the crankshaft 10 is formed as a ball bearing against a radial load. Main bearing 25 includes an outer race 37, a ball 38, an inner race 39, an oil seal 40, gears 41 and 42, a bolt 43. The main bearing 25 is positioned via the gears 41 and 42 by fastening the bolt 43 to the end of the shaft 15.

Next, the method of assembly of this embodiment will be described. As shown in FIG. 2, the outer race 26 is integrated (Step S1) with the roller 27 beforehand. It is then press-fitted and fixed (Step S2) to the side of the crankcase 20, and the oil seal 33 is press-fitted and fixed (Step S3) onto the seal bearing surface 36. Next, the inner race 28 separated from the side of the outer race 26 is loosely fitted (Step S4) onto the bearing seat 13 of the shaft 12. Then, the oil seal is pressed fitted (Step S5) onto shaft 12, and the timing sprocket 30 is press-fitted (Step S6) from the outside and the flange 31 is touched to the inner race 28.

In this state, the end of the shaft 12 of the crankshaft 10 is fitted (Step S7) into the inner space of the roller 22 from a right direction in FIG. 2. In the process, the shaft 12 is able to pass through the space surrounded by the roller 22 because the outer diameter R1 of the timing sprocket 30 and the outer diameter R3 of the flange 31 are respectively equal to or smaller than the outer diameter R4 of the inner race 28. Thus, the inner race 28 is fitted to an inner diameter part of the roller 22. The seal lip 34 of the oil seal 33 is sliding-fitted onto the periphery of the flange 31.

Afterward, when the left crankcase 20 and the right crankcase 23 to which the shaft 15 is fitted are joined together and integrated (Step S8), the crankcase 20 that supports the crankshaft 10 is assembled.

As described above, even if the inner diameter R2 of the inner race 28 is smaller than the outer diameter R1 of the timing sprocket 30, the crankshaft 10 can be assembled in the crankcase 20. As a result, the size of the main bearing 22 can be reduced so that the inner diameter R2 of the inner race 28 is smaller than the outer diameter of the timing sprocket 30. This arrangement has been impossible heretofore, and, until now, has made it difficult to miniaturize and lighten the main bearing 22.

In addition, as the periphery of the flange 31 functions as support structure of the oil seal 33, structure for mounting oil seal 33 is simplified.

The main bearing 22 is not necessarily required to be a roller bearing. If only the inner race can be separated, the main bearing may be also a needle bearing or a ball bearing.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An engine crankshaft support structure in an engine in which a sprocket for driving a timing chain for driving a camshaft is arranged outside a main bearing that supports a crankshaft, wherein:

for the main bearing, an outer race is press-fitted and fixed to a crankcase, an inner race is separated from the outer race and is loosely fitted onto the periphery of the crankshaft, the sprocket for driving the timing chain is press-fitted onto the periphery of the crankshaft for holding the inner race of the main bearing in place, and an oil seal mounting flange is integrated with the sprocket for driving the timing chain and is press-fitted against the inner race of the main bearing.

2. The engine crankshaft support structure according to claim 1, wherein the sprocket has an outer diameter R1 which is smaller than an outer diameter R4 of the inner race.

3. The engine crankshaft support structure according to claim 2 further comprising an oil seal mounting flange press-fitted onto the crankshaft and pressed against the inner race of the main bearing, wherein the sprocket for driving the timing chain is press-fitted onto the flange.

4. The engine crankshaft support structure according to claim 3, wherein the oil seal mounting flange has a thickened part having a diameter R3 on a side of the flange, the thickened part being pressed against the inner race of the main bearing, wherein the diameter R3 of the thickened part is substantially equal to the outer diameter R4 of the inner race and is greater than the outer diameter R1 of the sprocket.

5. The engine crankshaft support structure according to claim 1, wherein the outer race of the main bearing is press-fitted and fixed into a journal hole of the crankcase.

6. An engine crankshaft support structure, comprising:

a crankshaft;

a main bearing having a roller, an outer race press-fitted and fixed to a crankcase, and an inner race separated from the outer race and loosely fitted onto the periphery of the crankshaft; and a sprocket for driving a camshaft, the sprocket being press-fitted on the crankshaft and arranged at a position outside the main bearing, the sprocket having a outer diameter R1 which is smaller than an outer diameter R4 of the inner race; and an oil seal mounting flange press-fitted onto the crankshaft and pressed against the inner race of the main bearing, wherein the sprocket for driving the timing chain is press-fitted onto the flange.

7. The engine crankshaft support structure according to claim 6, wherein the oil seal mounting flange has a thickened part with a diameter R3 on a side of the flange, the thickened part being pressed against the inner race of the main bearing, wherein the diameter R3 of the thickened part is substantially equal to the outer diameter R4 of the inner race and is greater than the outer diameter R1 of the sprocket.

8. The engine crankshaft support structure according to claim 6, wherein the outer race of the main bearing is press-fitted and fixed into a journal hole of the crankcase.

9. The engine crankshaft support structure according to claim 6, wherein the inner race of the main bearing is disposed on a bearing seat of the crankshaft.

10. A method for assembling an engine crankshaft support structure comprising the steps of:

integrating a roller with an outer race of a main bearing;

press-fitting the outer race onto one of a right or a left crankcase;

press-fitting an oil seal onto a seal bearing surface of the same one of the right or the left crankcase;

loosely fitting an inner race of the main bearing onto a bearing seat of a shaft;

press-fitting an oil seal mounting flange onto the shaft so that it presses against the inner race;

press-fitting a sprocket for driving a timing chain onto the flange;

passing the shaft through the roller and fitting the inner race of the main bearing against the roller; and fitting and integrating the right and left crankcases to form an integral crankcase for supporting the shaft.

11. The engine crankshaft support structure according to claim 10, wherein the sprocket has an outer diameter R1 which is smaller than an outer diameter R4 of the inner race.

12. The engine crankshaft support structure according to claim 10, wherein the oil seal mounting flange has a thickened part with a diameter R3 on a side of the flange, the thickened part being pressed against the inner race of the main bearing, wherein the diameter R3 of the thickened part is substantially equal to the outer diameter R4 of the inner race and is greater than the outer diameter R1 of the sprocket.

13. The engine crankshaft support structure according to claim 10, wherein the outer race of the main bearing is press-fitted and fixed into a journal hole of the crankcase.

14. The engine crankshaft support structure according to claim 6, wherein the inner race of the main bearing is disposed on a bearing seat of the crankshaft.

* * * * *